United States Patent
Mizuno et al.

(10) Patent No.: US 10,576,807 B2
(45) Date of Patent: Mar. 3, 2020

(54) VEHICLE AIR CONDITIONING SETTING DEVICE

(71) Applicant: DENSO CORPORATION, Kariya, Aichi-pref. (JP)

(72) Inventors: Wataru Mizuno, Kariya (JP); Takeshi Yamamoto, Kariya (JP); Yoshinori Watanabe, Kariya (JP); Yuko Nakamura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 59 days.

(21) Appl. No.: 15/562,176

(22) PCT Filed: Mar. 17, 2016

(86) PCT No.: PCT/JP2016/001531
§ 371 (c)(1),
(2) Date: Sep. 27, 2017

(87) PCT Pub. No.: WO2016/157789
PCT Pub. Date: Oct. 6, 2016

(65) Prior Publication Data
US 2018/0086179 A1    Mar. 29, 2018

(30) Foreign Application Priority Data

Apr. 2, 2015 (JP) .................................. 2015-076214
Feb. 19, 2016 (JP) .................................. 2016-029763

(51) Int. Cl.
*B60H 1/00* (2006.01)

(52) U.S. Cl.
CPC ..... *B60H 1/00828* (2013.01); *B60H 1/00021* (2013.01); *B60H 1/00871* (2013.01); *B60H 1/00985* (2013.01); *B60H 2001/00185* (2013.01)

(58) Field of Classification Search
CPC ............ B60H 1/00985; B60H 1/00828; B60H 1/00021; B60H 1/00871; B60H 2001/00185
See application file for complete search history.

(56) References Cited

U.S. PATENT DOCUMENTS

2009/0312900 A1* 12/2009 Tschirhart .......... B60H 1/00985
701/36
2010/0026643 A1  2/2010 Ozawa et al.
(Continued)

FOREIGN PATENT DOCUMENTS

JP    H11078483 A    3/1999
JP    H11208246 A    8/1999
(Continued)

*Primary Examiner* — Nelson J Nieves
(74) *Attorney, Agent, or Firm* — Harness, Dickey & Pierce, P.L.C.

(57) ABSTRACT

A vehicle air conditioning setting device functioning with a vehicle air conditioning device for setting a direction of air blown out from an air outlet and a degree of concentration and diffusion of the air is provided. The vehicle air conditioning setting device includes: a display unit that displays an air range designation image including an occupant image representing an occupant seated on a seat of the vehicle; a touch panel overlapped with the display unit; and an air range setting unit that sets an air range representing the direction of the air and the degree of concentration and diffusion of the air based on an operation range of the touch panel on the air range designation image. When a drag operation is performed on the touch panel, the air range setting unit sets the air range based on a range of the drag operation.

12 Claims, 9 Drawing Sheets

(56) References Cited

U.S. PATENT DOCUMENTS

| | | | | |
|---|---|---|---|---|
| 2012/0330507 A1* | 12/2012 | Auner | ............... | B60H 1/00985 701/36 |
| 2013/0047112 A1* | 2/2013 | Waller | ............... | B60H 1/00985 715/771 |
| 2014/0058633 A1* | 2/2014 | Kuroda | ................... | B60R 16/02 701/49 |
| 2015/0061841 A1* | 3/2015 | Lee | ....................... | G08C 17/02 340/12.5 |
| 2015/0105976 A1* | 4/2015 | Shikii | ................... | G06F 3/0488 701/36 |
| 2015/0204556 A1* | 7/2015 | Kusukame | ......... | B60H 1/00742 165/237 |
| 2015/0328958 A1* | 11/2015 | Winget, Jr. | ........ | B60H 1/00742 454/155 |
| 2016/0229264 A1* | 8/2016 | Horiuchi | ............ | B60H 1/00842 |
| 2016/0306532 A1* | 10/2016 | Ko | ...................... | G06F 3/04847 |
| 2016/0347151 A1* | 12/2016 | Arakawa | ............. | G06F 3/04847 |
| 2017/0282717 A1* | 10/2017 | Jang | ....................... | B60K 37/06 |
| 2018/0208017 A1* | 7/2018 | Hernandez | ......... | B60H 1/00985 |
| 2018/0265043 A1* | 9/2018 | Salter | ..................... | B60S 1/026 |

FOREIGN PATENT DOCUMENTS

| | | | |
|---|---|---|---|
| JP | 3952852 | B2 | 8/2007 |
| JP | 2008265675 | A * | 11/2008 |
| JP | 2008296837 | A | 12/2008 |
| JP | 2009058194 | A | 3/2009 |
| JP | 2010000820 | A | 1/2010 |
| JP | 2010055598 | A | 3/2010 |
| JP | 2012118825 | A | 6/2012 |
| JP | 2013076493 | A | 4/2013 |
| JP | 2015032276 | A | 2/2015 |

* cited by examiner

VEHICLE AIR CONDITIONING SETTING DEVICE

CROSS REFERENCE TO RELATED APPLICATIONS

This application is a U.S. National Phase Application under 35 U.S.C. 371 of International Application No. PCT/JP2016/001531 filed on Mar. 17, 2016 and published in Japanese as WO 2016/157789 A1 on Oct. 6, 2016. This application is based on and claims the benefit of priority from Japanese Patent Applications No. 2015-076214 filed on Apr. 2, 2015, and No. 2016-029763 filed on Feb. 19, 2016. The entire disclosures of all of the above applications are incorporated herein by reference.

TECHNICAL FIELD

The present disclosure relates to a vehicle air conditioning setting device that performs setting relating to air conditioning in a vehicle, and particularly, to a technique for setting the direction of air blown out from an air outlet.

BACKGROUND ART

There has been conventionally known a technique disclosed in Patent Literature 1 as a technique for setting the direction of air blown out from an air outlet in a vehicle. In the technique disclosed in Patent Literature 1, an image of an occupant of a vehicle is displayed on a display device on which a touch panel is superimposed, and the occupant touches a desired location to be set as an air-blowing target area on the touch panel with his/her finger to set the location as the air-blowing target area.

Further, as disclosed in Patent Literatures 2 to 5, there have also been widely known techniques for electronically controlling setting of the up-down and right-left directions of air blown out from an air outlet, setting of the degree of concentration or diffusion of air, and opening/closing of an air flow passage.

PRIOR ART LITERATURES

Patent Literature

Patent Literature 1: JP-3952852-B
Patent Literature 2: JP-2008-296837-A
Patent Literature 3: JP-2010-820-A
Patent Literature 4: JP-H11-78483-A
Patent Literature 5: JP-H11-208246-A

SUMMARY

According to the technique of the Patent Literature 1, an occupant can easily set the direction of air blown out from the air outlet. However, when the concentration or diffusion of air blown out from the air outlet is set by using the technique of Patent Literature 1, it is necessary to successively touch a plurality of locations on the touch panel with a finger to diffuse the air, which is burdensome.

In view of such a circumstance, it is an object of the present disclosure to provide a vehicle air conditioning setting device that enables an occupant to set the direction and the concentration or diffusion of air blown out from an air outlet by a simple operation.

According to an example of the present disclosure, a vehicle air conditioning setting device is mounted on a vehicle, and functions with a vehicle air conditioning device for setting a direction of air blown out from an air outlet and a degree of concentration and diffusion of the air. The vehicle air conditioning setting device includes: a display unit that displays an air range designation image including an occupant image representing an occupant seated on a seat of the vehicle; a touch panel overlapped with the display unit; and an air range setting unit that sets an air range representing the direction of the air and the degree of concentration and diffusion of the air based on an operation range of the touch panel on the air range designation image. When a large operation-amount operation, in which an operation amount of one of an operation distance in a direction along a surface of the touch panel and a pressing force to the touch panel is larger than a tap operation, is performed with respect to the touch panel, the air range setting unit sets the air range based on the operation amount of the large operation-amount operation.

According to the vehicle air conditioning setting device, when the large operation-amount operation having a larger operation amount than the tap operation, the operation amount being either the operation distance in the direction along the surface of the touch panel or the pressing force to the touch panel, is performed with respect to the touch panel, the air range representing the direction and the degree of concentration or diffusion of air is set on the basis of the operation amount of the large operation amount operation. That is, the direction and the degree of concentration or diffusion of air are set by a single large operation-amount operation. Thus, it is possible to set the direction and the degree of concentration or diffusion of air blown out from the air outlet by a simple operation.

BRIEF DESCRIPTION OF DRAWINGS

The above and other objects, features and advantages of the present disclosure will become more apparent from the following detailed description made with reference to the accompanying drawings. In the drawings.

EMBODIMENTS

<First Embodiment>

Hereinbelow, an embodiment will be described with reference to the drawings.

(Configuration of Vehicle Air Conditioning System 100)

Figure 1:
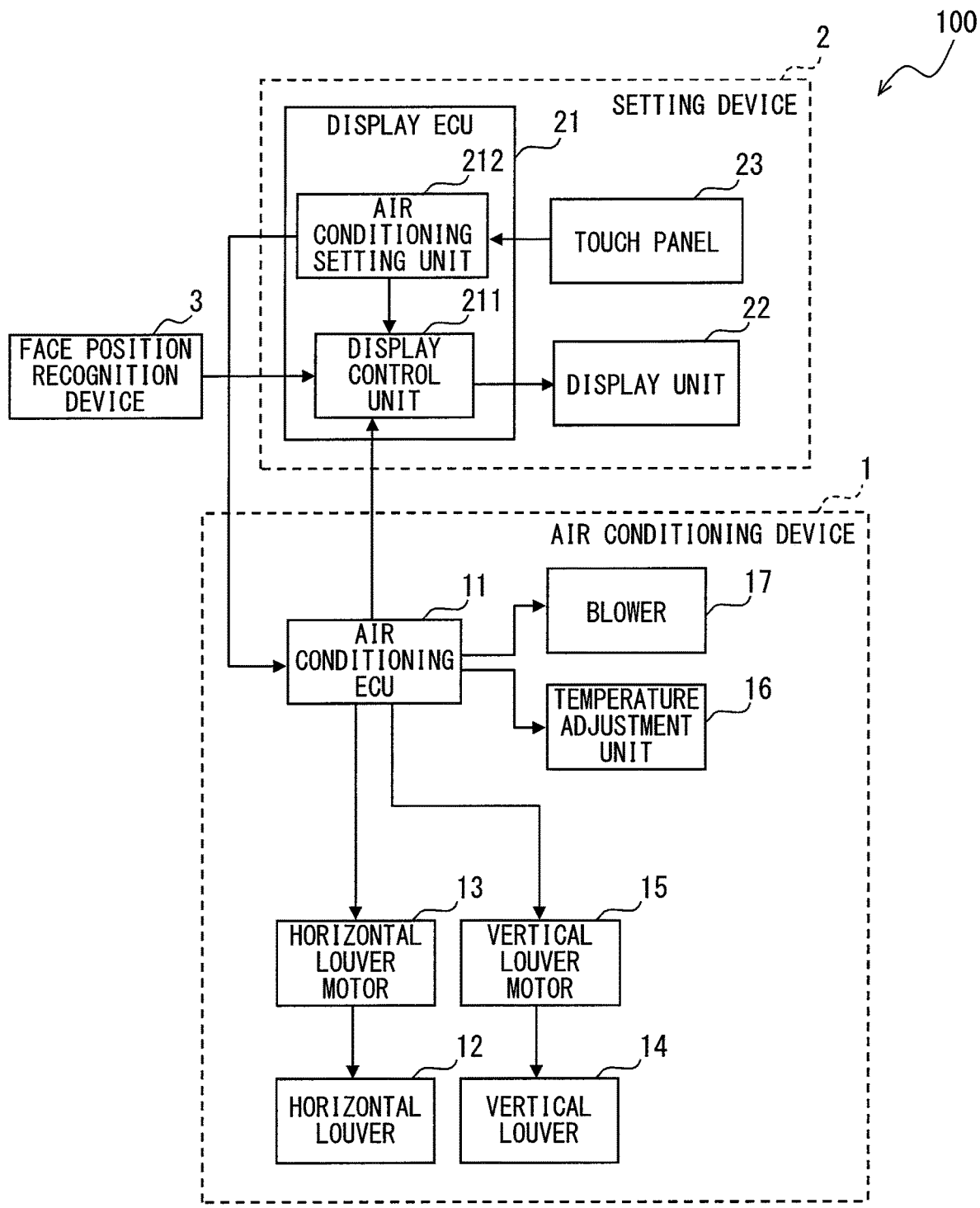
FIG. 1 is a block diagram illustrating the configuration of a vehicle air conditioning system.

A vehicle air conditioning system 100 illustrated in FIG. 1 is mounted on a vehicle. The vehicle air conditioning system 100 includes a vehicle air conditioning device (hereinbelow, the air conditioning device) 1, a setting device 2, and a face position recognition device 3. In the following description, the vehicle equipped with the vehicle air conditioning system 100 is referred to as an own vehicle.

The air conditioning device 1 is a device that air-conditions the inside of a vehicle cabin of the own vehicle. As illustrated in FIG. 1, the air conditioning device 1 is provided with an air conditioning ECU 11, a horizontal louver 12, a horizontal louver motor 13, a vertical louver 14, a vertical louver motor 15, a temperature adjustment unit 16, and a blower 17.

The horizontal louver 12 is disposed on an air outlet or on the upstream side in an air flow passage with respect to the air outlet. The horizontal louver 12 is provided with a plurality of long plates each of which extends in the horizontal direction, that is, a width direction of the own vehicle. These long plates are arranged at intervals in a direction intersecting the longitudinal direction of the long plates. Each of the long plates of the horizontal louver 12 is disposed turnably around a shaft which extends in the longitudinal direction of the long plate.

The horizontal louver motor 13 is a motor for driving the shaft of each of the long plates of the horizontal louver 12 and, for example, includes a plurality of motors so as to individually drive the shafts of the respective long plates.

The vertical louver 14 is disposed near the horizontal louver 12 on the air outlet or on the upstream side in the air flow passage with respect to the air outlet. The vertical louver 14 is provided with a plurality of long plates each of which extends in the arrangement direction of the long plates of the horizontal louver 12. These long plates are arranged at intervals in the longitudinal direction of the long plates of the horizontal louver 12. Each of the long plates of the vertical louver 14 is disposed turnably around a shaft which extends in the longitudinal direction of the long plate.

The vertical louver motor 15 is a motor for driving the shaft of each of the long plates of the vertical louver 14 and, for example, includes a plurality of motors so as to individually drive the shafts of the respective long plates.

The orientation of the vertical louver 14 is controlled by the vertical louver motor 15, which adjusts the right-left direction of air blown out from the air outlet which is located on the downstream side of the vertical louver 14 and the degree of concentration or diffusion of the air.

Specifically, when the interval between adjacent long plates of the vertical louver 14 is reduced along the blow-out direction, the width in the right-left direction of air to be blown out is reduced. On the other hand, when the interval between adjacent long plates of the vertical louver 14 is increased along the blow-out direction, the width in the right-left direction of air to be blown out is increased.

Further, when each of the long plates of the vertical louver 14 is turned with the intervals between the long plates of the vertical louver 14 at the air outlet side maintained, the direction of air is adjusted in the right direction or the left direction of the own vehicle with the degree of concentration or diffusion of the air maintained.

The orientation of the horizontal louver 12 is controlled by the horizontal louver motor 13, which adjusts the up-down direction of air blown out from the air outlet which is located on the downstream side of the horizontal louver 12. In the present embodiment, a case in which the degree of concentration or diffusion in the up-down direction of air blown out from the air outlet is not adjusted will be described. However, the degree of concentration or diffusion in the up-down direction of air blown out from the air outlet may be adjusted. The width in the up-down direction of air to be blown out can be reduced by reducing the interval between adjacent long plates of the horizontal louver 12 along the blow-out direction. On the other hand, the width in the up-down direction of air to be blown out can be increased by increasing the interval between adjacent long plates of the horizontal louver 12 along the blow-out direction.

The temperature adjustment unit 16 includes a heat exchanger and adjusts the temperature of air blown out from the air outlet. The blower 17 adjusts the volume of air blown out from the air outlet.

The air conditioning ECU 11 is provided with a CPU and memories such as a ROM and a RAM. The air conditioning ECU 11 executes a control program stored in the ROM on the basis of a signal input from the setting device 2 to execute processing relating to air conditioning in the own vehicle. Note that some or all of functions executed by the air conditioning ECU 11 may be configured as hardware by one or more ICs.

The processing relating to air conditioning includes control of the temperature in the vehicle cabin using the temperature adjustment unit 16, control of the volume of air using the blower 17, and adjustment of the direction and the degree of concentration or diffusion of air using the horizontal louver 12, the horizontal louver motor 13, the vertical louver 14, and the vertical louver motor 15.

The setting device 2 as a vehicle air conditioning setting device is provided with a display ECU 21, a display unit 22, and a touch panel 23. The display unit 22 is capable of performing color display and can be configured using, for example, a liquid crystal display. The touch panel 23 is superimposed on the display unit 22. The display unit 22 with the touch panel 23 superimposed thereon is disposed at a position within the reach of a driver who is seated on a driver's seat.

The display ECU 21 is provided with a CPU and memories such as a ROM and a RAM. The CPU executes a control program stored in the ROM while using a temporary storage function of the RAM, so that the display ECU 21 functions as a display control unit 211 and an air conditioning setting unit 212. Although, in the present embodiment, the display ECU 21 functions as the display control unit 211 and the air conditioning setting unit 212, separate ECUs may function as the display control unit 211 and the air conditioning setting unit 212. Further, some or all of functions executed by the display ECU 21 may be configured as hardware by one or more ICs.

Figure 2:
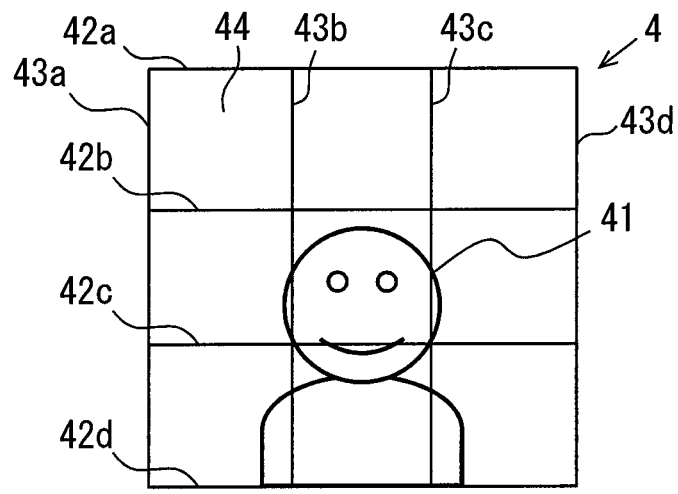
FIG. 2 is a diagram illustrating an air range designation image displayed on a display unit as an example.

The display control unit 211 displays various setting images for performing setting with respect to the air conditioning device 1 on the display unit 22. The setting images include an air range designation image 4 illustrated in FIG. 2 and the like. Further, a screen that indicates a state of air conditioning performed by the air conditioning device 1 is also displayed on the display unit 22.

The air conditioning setting unit 212 performs various kinds of setting with respect to the air conditioning device 1 on the basis of signals input from the touch panel 23 with a setting screen for performing the setting with respect to the air conditioning device 1 displayed on the display unit 22.

Examples of the setting with respect to the air conditioning device 1 include temperature setting, selection of the air blow port, and setting of the volume of air. Further, the examples also include setting of the direction of air to the vicinity of the driver's seat and the degree of concentration or diffusion of the air and setting of the direction of air to the vicinity of a passenger seat and the degree of concentration or diffusion of the air. Thus, the air conditioning setting unit 212 corresponds to an air range setting unit.

The setting of the direction of air to the vicinity of the driver's seat and the degree of concentration or diffusion of the air is performed with the air range designation image 4 displayed on the display unit 22 by the display control unit 211. Further, the setting of the direction of air to the vicinity of the passenger seat and the degree of concentration or diffusion of the air is also performed with the air range designation image 4 displayed on the display unit 22 by the display control unit 211.

The face position recognition device 3 has a known configuration provided with a camera which captures an image of the face of a front seat occupant (that is, the driver and an occupant of the passenger's seat) and the vicinity thereof and a control unit which analyzes the image captured by the camera and determines a face position of the front seat occupant. The face position recognition device 3 successively outputs signals indicating the determined face position of the front seat occupant to the display control unit 211 of the display ECU 21.

(Setting of Air Range)

Next, the setting of the direction of air to the vicinity of the driver's seat and the degree of concentration or diffusion of the air and the setting of the direction of air to the vicinity of the passenger seat and the degree of concentration or diffusion of the air which are performed by the air conditioning setting unit 212 will be described.

In order to set the direction and the degree of concentration or diffusion of air, an air range is set in the present embodiment. When an operation for displaying the air range designation image 4 is performed with respect to the touch panel 23, the air conditioning setting unit 212 outputs an instruction for displaying the air range designation image 4 illustrated in FIG. 2 on the display unit 22 to the display control unit 211.

The operation for displaying the air range designation image 4 can be performed with respect to each of the driver's seat and the passenger seat. An air range to the vicinity of the driver's seat can be set using the air range designation image 4 with respect to the driver's seat. An air range to the vicinity of the passenger seat can be set using the air range designation image 4 with respect to the passenger seat. A method for setting the air range to the vicinity of the driver's seat is the same as a method for setting the air range to the vicinity of the passenger seat after the air range designation image 4 is displayed.

The air range designation image 4 of the present embodiment has a square shape and includes an occupant image 41, a grid horizontal line 42, and a grid vertical line 43. The occupant image 41 is an image representing an occupant who is seated on the front seat. The occupant image 41 of the present embodiment is not an image of the front seat occupant that is actually captured, but an image that is previously prepared. However, an image of the driver or the passenger seat occupant that is actually captured may be used as the occupant image 41.

As described above, a signal indicating the face position of the front seat occupant recognized by the face position recognition device 3 is input to the display control unit 211. The display control unit 211 updates a display position of the occupant image 41 on the basis of the signal so that the position of the occupant image 41 within the air range designation image 4 corresponds to the actual position of the front seat occupant.

A plurality of the grid horizontal lines 42 are displayed on the air range designation image 4. Specifically, in FIG. 2, four grid horizontal lines 42a, 42b, 42c, 42d are displayed. When the grid horizontal lines 42a, 42b, 42c, 42d are not distinguished from each other, the grid horizontal lines 42a, 42b, 42c, 42d are merely referred to as the grid horizontal lines 42. All the four grid horizontal lines 42 extend in the vehicle-width direction, and are parallel to each other and arranged at regular intervals. The interval between the grid horizontal lines 42 is longer than a contact length in the up-down direction of a fingertip with respect to the touch panel 23 when the touch panel 23 is touched with the fingertip, for example, approximately twice the contact length.

Similarly, a plurality of the grid vertical lines 43 are displayed on the air range designation image 4. Specifically, four grid vertical lines 43a, 43b, 43c, 43d are displayed. When the grid vertical lines 43a, 43b, 43c, 43d are not distinguished from each other, the grid vertical lines 43a, 43b, 43c, 43d are merely referred to as the grid vertical lines 43. These four grid vertical lines 43 extend in the up-down direction, and are parallel to each other and arranged at regular intervals.

Further, in the present embodiment, the interval between the grid horizontal lines 42 is equal to the interval between the grid vertical lines 43. Thus, a rectangular range 44 which is surrounded by two grid horizontal lines 42 and two grid vertical lines 43 has a square shape. In the air range designation image 4 illustrated in FIG. 2, rectangular ranges 44 of 3 rows·3 columns are formed by the four grid horizontal lines 42 and the four grid vertical lines 43.

Figure 3:
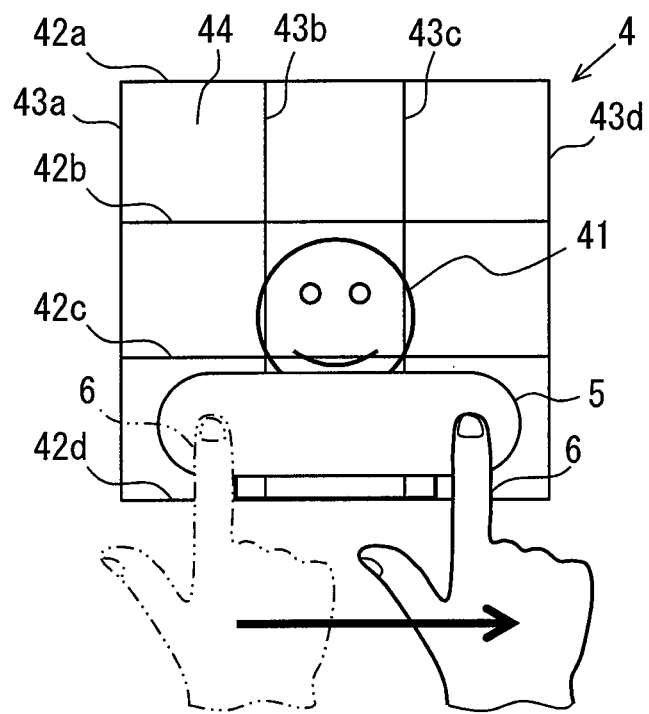
FIG. 3 is a diagram illustrating a state in which a drag operation is performed on the air range designation image.

FIG. 3 illustrates a state in which a drag operation is performed on the air range designation image 4 with an index finger 6. As widely known, a drag operation is an operation of moving an operation body such as a finger along the surface of the touch panel 23 with the operation body remaining in contact with the surface of the touch panel 23. On the other hand, in a tap operation, an operation body is brought into contact with the touch panel 23 and then released from the touch panel 23 without sliding the operation body. Thus, a drag operation has a longer operation distance in the direction along the surface of the touch panel 23 than a tap operation and corresponds to a large operation amount operation.

In the drag operation illustrated in FIG. 3, a starting point is the lower left rectangular range 44, and an end point is the lower right rectangular range 44. The index finger 6 moves between the grid horizontal lines 42c, 42d from the starting point to the end point without crossing the grid horizontal lines 42c, 42d.

Figure 5:
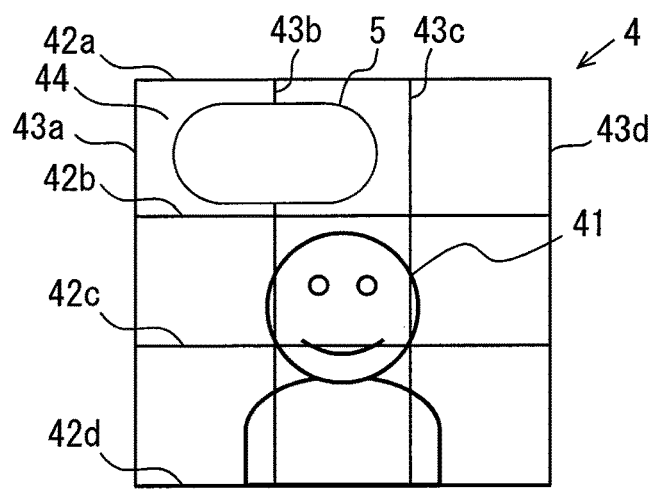
FIG. 5 is a display example of an air range figure different from FIG. 4.

In the process of the drag operation, as illustrated in FIG. 3, an air range FIG. 5 which extends from the starting point of the drag operation to the position of the index finger 6 is successively updated with the movement of the index finger 6 and displayed in a superimposed manner on the air range designation image 4. The air range FIG. 5 is also displayed on the display unit 22 by the display control unit 211.

Figure 4:
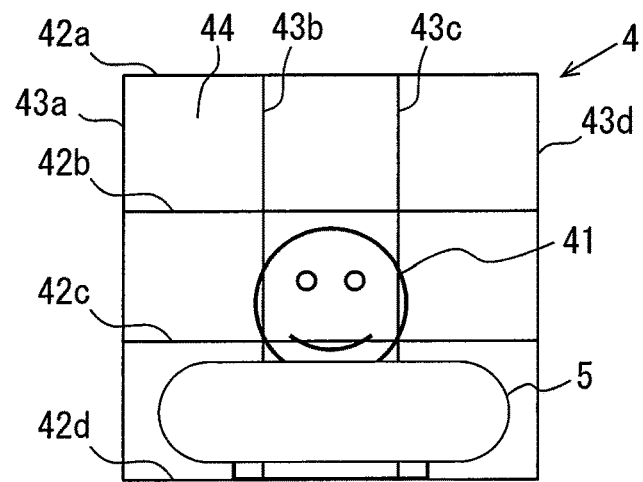
FIG. 4 is a diagram illustrating a state in which an air range figure corresponding to a set air range is displayed in a superimposed manner on the air range designation image.

The drag operation illustrated in FIG. 3 is a normal operation which can set a range between the starting point and the end point as the air range as it is. In the case of a drag operation as a normal operation, when the drag operation is ended, that is, when the index finger 6 is released from the touch panel 23 (not illustrated in FIG. 3), the air range FIG. 5 which extends from the drag operation starting point to the drag operation end point is displayed as it is as illustrated in FIG. 4.

In the first embodiment, when an operation body is released from the touch panel 23, the air range FIG. 5 and the air range are determined at this point in time. When a touch operation is newly performed on the air range designation image 4 with the air range FIG. 5 displayed, the display control unit 211 deletes the displayed air range FIG. 5 and displays an air range FIG. 5 that is determined on the basis of the new touch operation. The air conditioning setting unit 212 sets an air range corresponding to the newly-displayed air range FIG. 5.

(Air Range in Normal Operation)

When a drag operation is a normal operation, the air conditioning setting unit 212 sets an air range on the basis of a range from a starting point to an end point of the drag operation. When a drag operation is not a normal operation, a range of the drag operation cannot be set as an air range as it is. Hereinbelow, a drag operation that is not a normal operation is referred to as a mistaken operation. A mistaken operation and an air range that is set in the mistaken operation will be specifically described below. First, an air range that is set in a normal operation will be described.

The air range designation image 4 is associated with a range in which the front seat occupant is normally located. Specifically, the air range designation image 4 when the driver's seat is designated corresponds to a range in which the driver seated on the driver's seat is located at the position of the normal occupant image 41. The air range designation image 4 when the passenger seat is designated corresponds to a range in which an occupant seated on the passenger seat is located at the position of the normal occupant image 41.

Thus, the air range FIG. 5 which is displayed in a superimposed manner on the air range designation image 4 represents a range of air blown out to the vicinity of the driver or the passenger seat occupant. In the present embodiment, a range of air in the up-down direction is in a unit of a range between two grid horizontal lines 42. On the other hand, a range of air in the right-left direction has no relation with the grid vertical lines 43 and corresponds to a range from a starting point to an end point of a drag operation on the air range designation image 4.

When the air range is set by the drag operation illustrated in FIG. 3, the up-down direction of air blown out toward the front seat occupant from the air outlet corresponds to a range between the two grid horizontal lines 42c, 42d illustrated in FIGS. 3 and 4. Further, the right-left direction and the degree of concentration or diffusion of the air correspond to substantially the entire range in the right-left direction of the air range designation image 4. Note that the number of air outlets from which air is blown out to the front seat occupant may be one or more.

Figure 6:
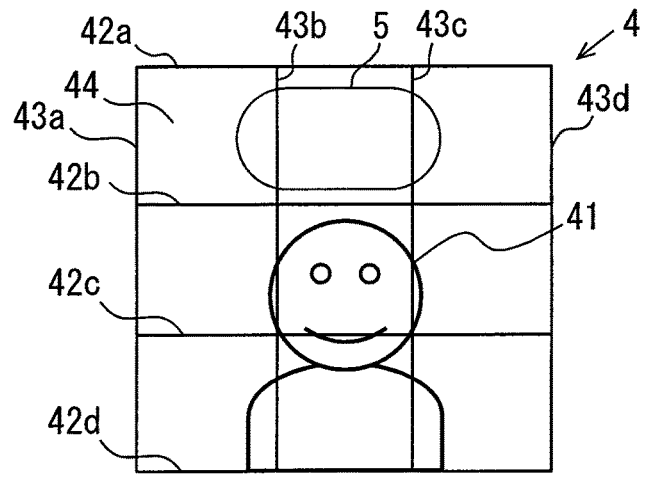
FIG. 6 is a display example of an air range figure different from FIGS. 4 and 5.

FIGS. 5 and 6 are also display examples of the air range FIG. 5 after the end of a drag operation when the drag operation is a normal operation. When the air range FIG. 5 is displayed at the position of FIG. 5, the up-down direction of air blown out toward the front seat occupant from the air outlet corresponds to a range between the two grid horizontal lines 42a, 42b. The right-left direction and the degree of concentration or diffusion of the air correspond to a range between a point between the grid vertical lines 43a, 43b and a point between the grid vertical lines 43b, 43c.

When the air range FIG. 5 is displayed at the position of FIG. 6, the up-down direction of air blown out toward the front seat occupant from the air outlet is the same as that of FIG. 5. The right-left direction and the degree of concentration or diffusion of the air correspond to a range between a point between the grid vertical lines 43a, 43b and a point between the grid vertical lines 43c, 43d. Although the right-left direction of the air in FIG. 6 differs from that in FIG. 5, the degree of concentration or diffusion in FIG. 6 is the same as that in FIG. 5.

Figure 7:
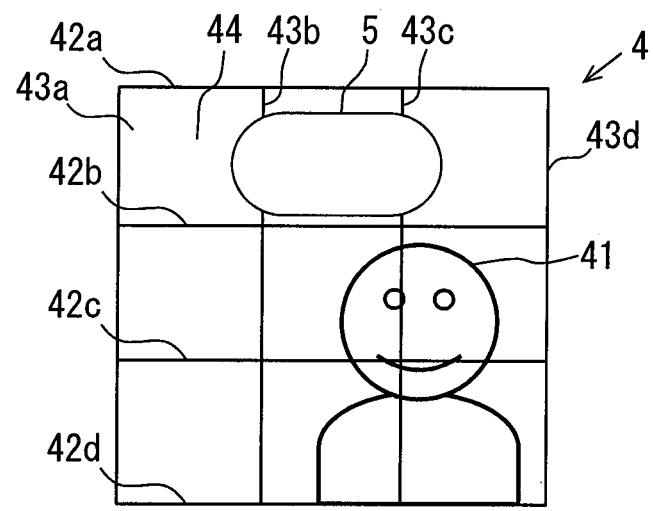
FIG. 7 is a diagram illustrating an air range designation image in which the position of an occupant image differs from that of FIG. 6.

In a display example of FIG. 7, the display position and the size of the air range FIG. 5 are the same as those of FIG. 6. However, the position of the occupant image 41 in FIG. 7 differs from that in FIG. 6. The reason why the position of the occupant image 41 in FIG. 7 differs from that in FIG. 6 is that the display control unit 211 displays the occupant image 41 within the air range designation image 4 at a position corresponding to the actual position of the front seat occupant on the basis of a signal input from the face position recognition device 3.

Figure 8:
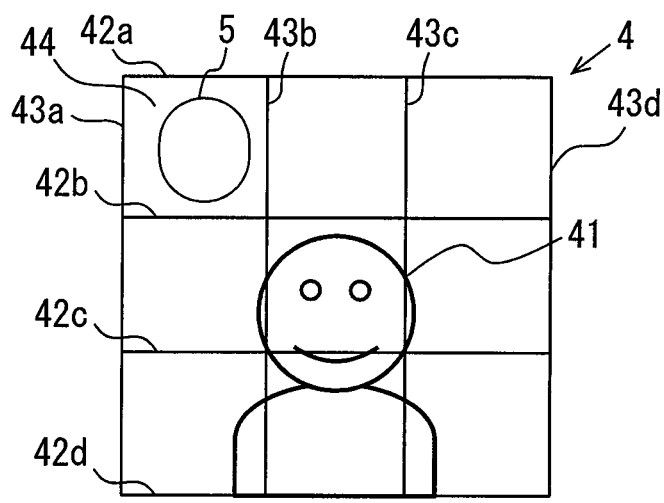
FIG. 8 is a diagram illustrating an air range figure corresponding to an air range set by a tap operation as an example.

FIG. 8 is a display example of the air range FIG. 5 after the end of a tap operation when the tap operation is performed instead of the drag operation. When a tap operation is performed, the air conditioning setting unit 212 sets a minimum range that is determined on the basis of the tap operation as an air range.

As described above, in the present embodiment, a range in the right-left direction of the air range is set irrespective of the grid vertical lines 43. Thus, when a tap operation is performed, a range that includes a position determined by the tap operation and has a minimum length in the right-left direction is set as a range in the right-left direction of the air range. The minimum length in the right-left direction is determined on the basis of a length in the right-left direction of the most concentrated air blown out by the air conditioning device 1. A range of air in the up-down direction is in a unit of a range between two grid horizontal lines 42. Thus, a range in the up-down direction of the air range when a tap operation is performed is between two grid horizontal lines 42 that sandwich the tapped position therebetween.

(Air Range in Mistaken Operation)

Next, an air range that is set when a drag operation is a mistaken operation will be described. The mistaken operation is a drag operation that designates an air range that cannot be set by the air conditioning device 1. Specifically, the mistaken operation in the present embodiment includes the following (1) to (3): (1) a drag operation that crosses the grid horizontal line 42 (hereinbelow, referred to as an oblique operation); (2) a drag operation whose starting point is located at the position of the face of the occupant image 41 (hereinbelow, referred to as a face-starting point operation); and (3) a drag operation in which at least one of a starting point and an end point is located outside the air range designation image 4 (hereinbelow, referred to as a protrusion operation).

When a drag operation is a mistaken operation, an air range is set on the basis of a part of the drag operation range. For example, when a drag operation is not a face-starting point operation, but an oblique operation, a drag operation starting point on the air range designation image 4 is used as the part of the drag operation range, and a range that is determined on the basis of the drag operation starting point is set as an air range.

Figure 9:
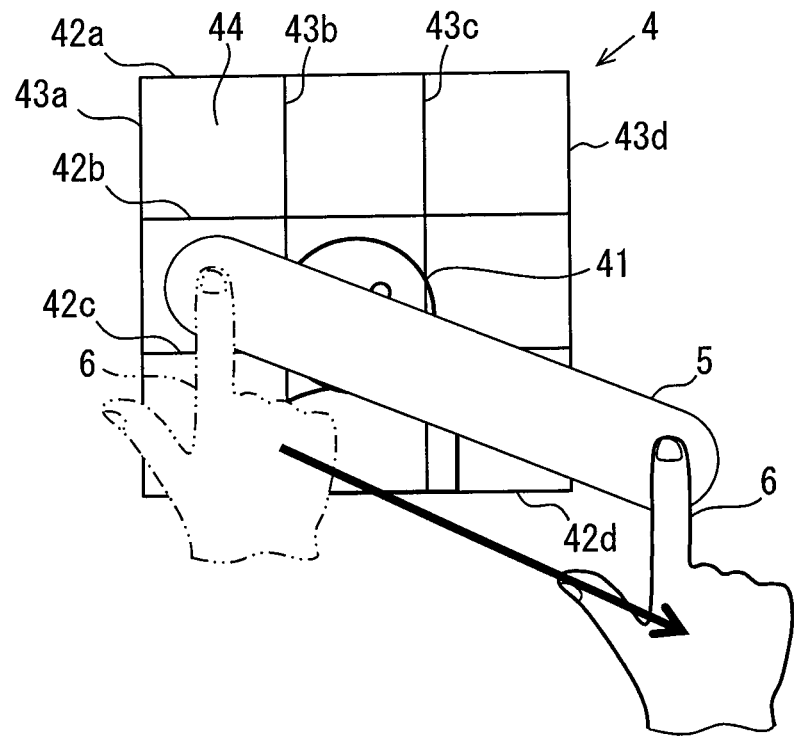
FIG. 9 is a diagram illustrating a state in which an oblique operation as an example of a mistaken operation is performed.

FIG. 9 illustrates an example in which the direction of a drag operation is a right obliquely downward direction and the drag operation thus crosses the grid horizontal line 42c. As illustrated in FIG. 9, even when a drag operation is a mistaken operation, the air range FIG. 5 is successively updated and displayed with the movement of the index finger 6 during the drag operation.

Figure 10:
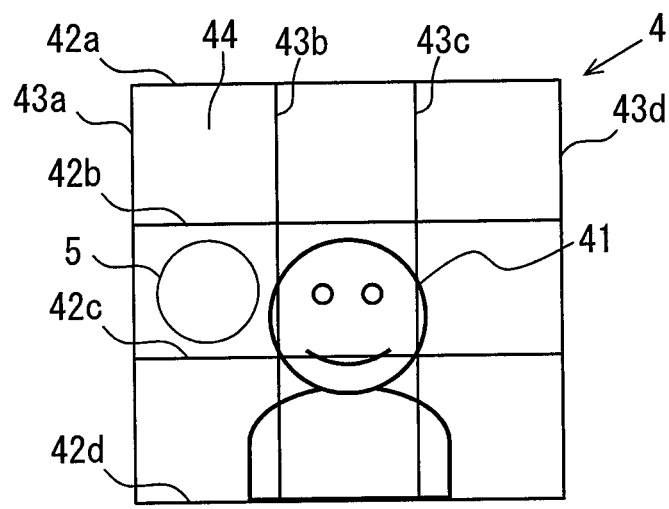
FIG. 10 is a diagram illustrating an air range figure that is displayed on the display unit corresponding to an air range set after the oblique operation of FIG. 9.

FIG. 10 illustrates the air range designation image 4 on which the air range FIG. 5 displayed after the end of the drag operation from the state of FIG. 9 is displayed in a superimposed manner. The air range FIG. 5 illustrated in FIG. 10 is displayed within the rectangular range 44 that includes the starting point of the drag operation. The length in the up-down direction of the air range FIG. 5 is equal to that of the air range FIG. 5 during a normal operation, and the length in the right-left direction thereof is a right-left direction length that is previously set during a mistaken operation.

In an air range when the air range FIG. 5 illustrated in FIG. 10 is displayed on the display unit 22, the up-down direction of air is between the grid horizontal lines 42b, 42c, and the right-left direction of the air is within the rectangular range 44 that includes the starting point of the drag operation. Further, the degree of concentration or diffusion is in a most concentrated state.

Further, in FIG. 9, the end point of the drag operation is located outside the air range designation image 4. Thus, the drag operation is also a protrusion operation. However, in the present embodiment, an action for the oblique operation has a higher priority than an action for the protrusion operation.

When a mistaken operation is a face-starting point operation, a part or the whole of a right-side part of the drag operation range, the right-side part being located on the right side with respect to the occupant image 41, on the air range designation image 4 is set as an air range. Then, an air range FIG. 5 corresponding to the air range is displayed in a superimposed manner on the air range designation image 4. The part of the right-side part of the drag operation range with respect to the occupant image 41 is, for example, the rectangular range 44 that is located on the right side with respect to the occupant image 41.

Further, the occupant image 41 may be shifted from the center of the air range designation image 4 depending on the occupant position, and no part of the drag operation range may be located on the right side with respect to the occupant image 41. In this case, no air range is set.

Figure 11:
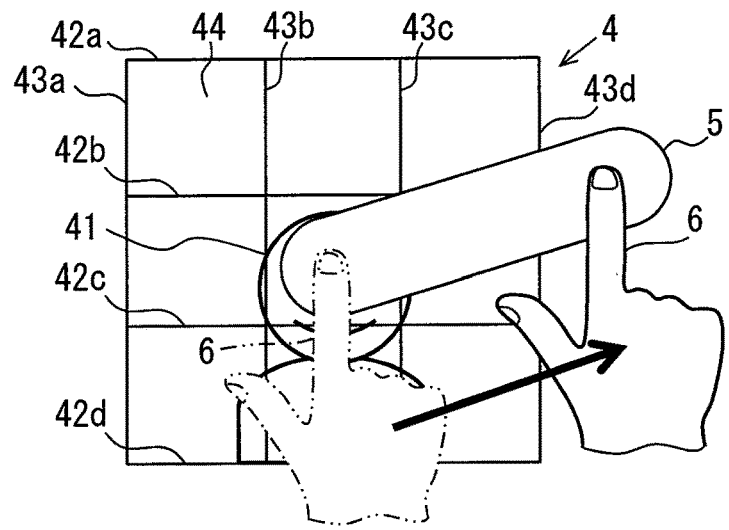
FIG. 11 is a diagram illustrating a state in which a face-starting point operation as an example of the mistaken operation is performed.
Figure 12:
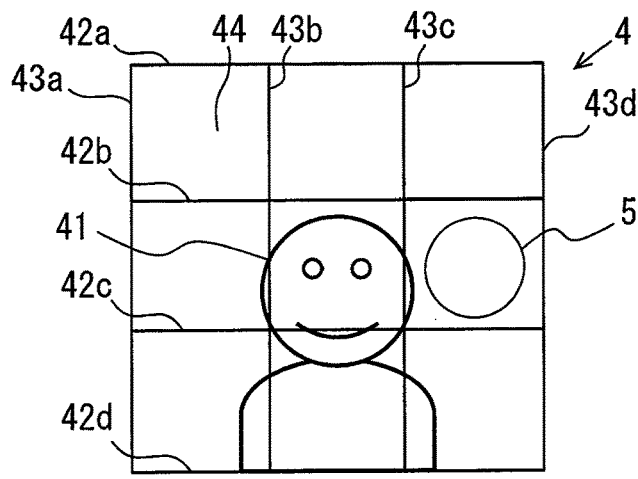
FIG. 12 is a diagram illustrating an air range FIG. 5 that is displayed on the display unit corresponding to an air range set after the face-starting point operation of FIG. 11.

FIG. 11 is a display example in the middle of the face position-starting point operation. FIG. 12 illustrates the air range designation image 4 on which the air range FIG. 5 displayed after the end of the drag operation from the state of FIG. 11 is displayed in a superimposed manner.

When the starting point of the drag operation is the face position of the occupant image 41, as illustrated in FIG. 12, the air range FIG. 5 is displayed within the rectangular range 44 that is closer to the end point of the drag operation range than the face position of the occupant image 41 and located on the middle of the right end column. Then, a range corresponding to the air range FIG. 5 is set as an air range.

Further, in FIG. 11, the drag operation crosses the grid horizontal line 42b. Thus, the drag operation is also an oblique operation. However, in the present embodiment, an action for the face position-starting point operation has a higher priority than an action for the oblique operation. Thus, when the drag operation of FIG. 11 is performed, the air range FIG. 5 is displayed at the position illustrated in FIG. 12, and the range corresponding to the air range FIG. 5 is set as the air range.

In the case of the protrusion operation, the air conditioning setting unit 212 sets a range on the air range designation image 4 in the drag operation range as an air range, and the display control unit 211 displays the air range FIG. 5 corresponding to the air range in a superimposed manner on the air range designation image 4.

Figure 13:
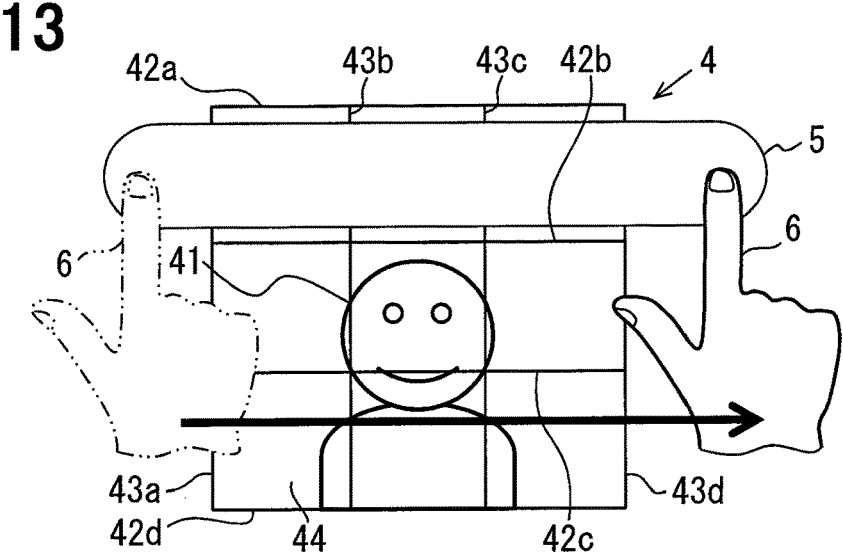
FIG. 13 is a diagram illustrating a state in which a protrusion operation as an example of the mistaken operation is performed.
Figure 14:
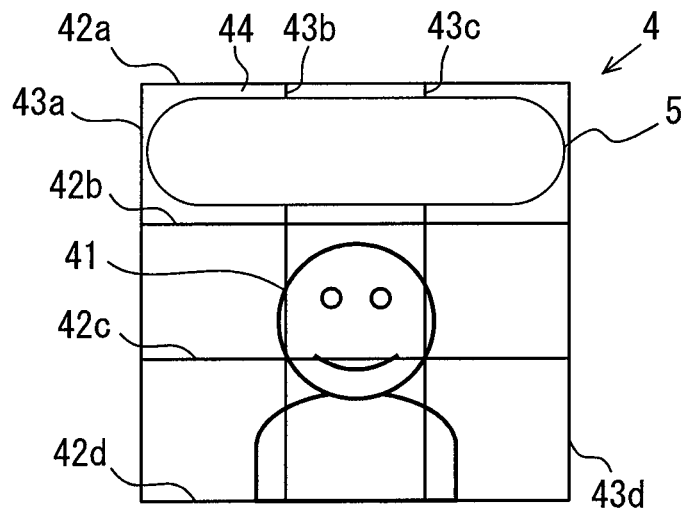
FIG. 14 is a diagram illustrating an air range figure that is displayed on the display unit corresponding to an air range set after the protrusion operation of FIG. 13.

FIG. 13 is a display example during a drag operation in which both a starting point and an end point of the drag operation range are located outside the air range designation image 4. FIG. 14 illustrates the air range designation image 4 on which the air range FIG. 5 displayed after the end of the drag operation from the state of FIG. 13 is displayed in a superimposed manner.

When the drag operation range does not cross the grid horizontal lines 42, but the starting point and the end point thereof are located outside the air range designation image 4 as illustrated in FIG. 13, a range from a starting point to an end point on the air range designation image 4 in the drag operation range is set as an air range, and the air range FIG. 5 corresponding to the air range is displayed in a superimposed manner on the air range designation image 4 as illustrated in FIG. 14.

(Summary of First Embodiment)

In the present embodiment described above, when the direction of air blown out to the front seat occupant from the air outlet and the degree of concentration of diffusion of the air are adjusted, the display control unit 211 displays the air range designation image 4 on the display unit 22 with the touch panel 23 superimposed thereon.

When a drag operation is performed on the touch panel 23 with the air range designation image 4 displayed on the display unit 22, the air conditioning setting unit 212 sets an air range that represents the direction and the degree of concentration or diffusion of air on the basis of a range of the drag operation. Thus, the direction and the degree of concentration or diffusion of air can be set by a single drag operation. Therefore, the direction and the degree of concentration or diffusion of air blown out from the air outlet can be set by a simple operation.

Further, in the present embodiment, when a tap operation is performed on the touch panel 23 with the air range designation image 4 displayed on the display unit 22, the air conditioning setting unit 212 sets a minimum range that is determined on the basis of the tap operation as an air range. Thus, it is possible to set air blown out from the air outlet to a most concentrated state and also easily perform an operation for setting the direction of the air in the most concentrated state.

Further, it is difficult for a person to accurately perform a drag operation in a straight line in the horizontal direction while riding in a vehicle. Even if a person tries to perform a drag operation in a straight line, a range of the drag operation becomes a slightly curved shape. On the other hand, it is considered that an intentional drag operation with a slightly curved shape is hardly performed. Thus, in the present embodiment, when a drag operation is performed on the air range designation image 4 and the drag operation does not cross the grid horizontal lines 42, the air conditioning setting unit 212 sets the air range assuming that the drag operation is performed in a straight line in the horizontal direction. Accordingly, even if the occupant erroneously performs a slightly curved drag operation in spite of the fact that the occupant has an intention of designating the air range in a straight line in the horizontal direction, the air range is set in a straight line as intended by the occupant.

Further, in the present embodiment, when a drag operation is a mistaken operation that designates a range of air that cannot be set by the air conditioning device 1, the air conditioning setting unit 212 sets an air range on the basis of a part of the drag operation range that is located on the air range designation image 4 and includes one of a starting point and an end point on the air range designation image 4. Thus, the air range can be set even in the mistaken operation.

When a mistaken operation is not a face position-starting point operation, but an oblique operation, the air conditioning setting unit 212 sets an air range on the basis of a starting point on the air range designation image 4 of the drag operation range. When a drag operation is an oblique operation, the end side of the drag operation is more likely to be deviated from an intended position than the staring side of the drag operation. Thus, in the oblique operation, when an air range is set on the basis of the starting point on the air range designation image 4 of the drag operation range, the air range is likely to relatively reflect the intention of a person who has performed the drag operation.

Further, when air is unintentionally blown to the face of the front seat occupant, the visibility on the front side may be disadvantageously reduced. Thus, in the present embodiment, a part corresponding to the occupant image 41 is not set as an air range in a face-starting point operation. Accordingly, even if a drag operation is a face starting point operation, it is possible to prevent air from blowing to the face of the front seat occupant.

Here, an occupant who has performed a drag operation as a face-starting point operation may have an intention to set the starting point at the left side of the occupant image 41 or set the starting point at the right side of the occupant image 41. Thus, setting the air range at the right side of the occupant image 41 and setting the air range at the left side of the occupant image 41 in the face-starting point operation may both be against the intention of the occupant. Thus, when the face-starting point operation is performed, there is also a high possibility that the occupant performs the drag operation again.

A drag operation can be more easily performed by moving a finger from left to right than moving a finger from right to left similarly to the case of writing characters regardless of a right-handed person or a left-handed person. Thus, when a drag operation is performed again, the drag operation is performed from left to right. In the drag operation performed again, when the air range FIG. 5 is displayed on the left side of the occupant image 41 to be a starting point of the drag operation, it is psychologically hard to perform the drag operation again.

However, in the present embodiment, in the face-starting point operation, a part or the whole of the right-side part of the drag operation range, the right-side part being located on the right side with respect to the occupant image 41, on the air range designation image 4 is set as an air range. This makes it possible to easily perform the drag operation again.

<Second Embodiment>

Next, a second embodiment will be described. In the following description of the second embodiment, an element having a reference sign used in the preceding embodiment is the same as an element having the same reference sign in the preceding embodiment unless otherwise specifically noted. Further, when only a part of a configuration is described, the embodiment previously described can be applied to the other part of the configuration.

In the second embodiment, a touch panel 23 has a configuration that is capable of detecting multi-touch and capable of detecting a pressing force to the touch panel 23 classified into a plurality of levels. In the present embodiment, the number of levels is three corresponding to the number of rectangular ranges 44 in the right-left direction in an air range designation image 4. Known touch panels having various configurations can be used as the touch panel 23 of the second embodiment. For example, a touch panel including a capacitance type sensor and a pressure sensor which are stacked may be used.

Further, it is not necessary for the touch panel 23 of the first embodiment to detect multi-touch, and it is only necessary to detect that the touch panel 23 is touched. Thus, a capacitance type touch panel that does not detect a pressing force can be used as the touch panel 23 of the first embodiment. However, the touch panel 23 that is the same as one used in the second embodiment may be used in the first embodiment.

In the second embodiment, an air conditioning setting unit 212 has the same function as that of the first embodiment. An air range is set similarly to the first embodiment when the touch panel 23 is single-touched and the pressing force is in the lowest pressing force level.

When the touch panel 23 is multi-touched and the pressing force to the touch panel 23 is in the second pressing force level or higher, the air conditioning setting unit 212 sets an air range different from that in the first embodiment. Note that the multi-touch indicates a state in which a plurality of positions on the touch panel 23 are simultaneously touched.

Figure 15:
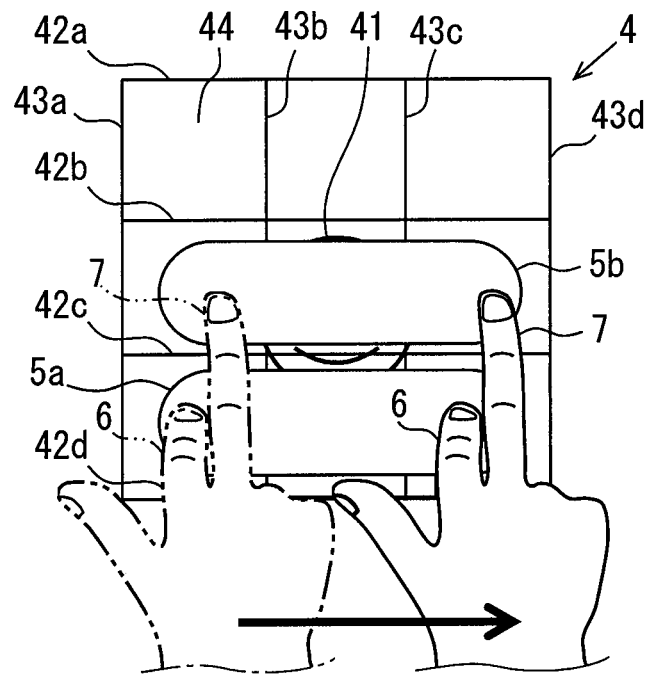
FIG. 15 is a display example of a second embodiment when drag operations are performed by multi-touch.

When the touch panel 23 is multi-touched, the same air range as that of the first embodiment is set on the basis of each of the plurality of touch positions. Thus, when drag operations are performed by multi-touch, the same processing as that of the first embodiment is performed with respect to each of the drag operations to set the air range. FIG. 15 illustrates a state in which drag operations are performed on the air range designation image 4 with an index finger 6 and a middle finger 7. The drag operation with the index finger 6 has a starting point within a lower left rectangular range 44 and an end point within a lower right rectangular range 44. The drag operation with the middle finger 7 has a starting point within a center rectangular range 44 on the left column and an end point within a center rectangular range 44 on the right column.

Also in the process of the drag operations with the index finger 6 and the middle finger 7, air range FIGS. 5a, 5b extending from the starting points of the drag operations to the index finger 6 and the middle finger 7 are successively updated with the movement of the index finger 6 and the middle finger 7 and displayed in a superimposed manner on the air range designation image 4.

Figure 16:
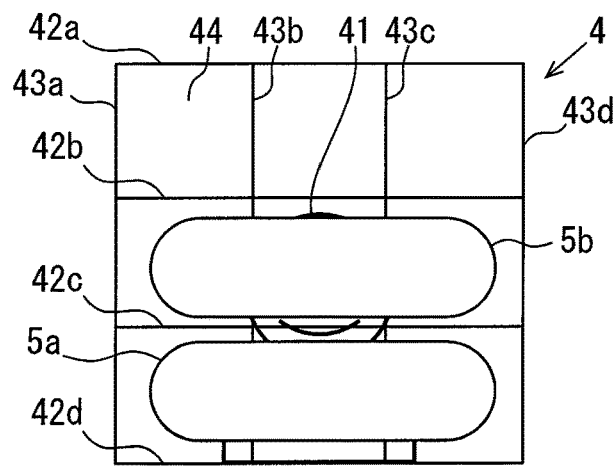
FIG. 16 is a display example after the end of the operation of FIG. 15.

It is determined whether each of the drag operations with the index finger 6 and the middle finger 7 is a normal operation or a mistaken operation similarly to the first embodiment, and an air range is set to a range corresponding to the normal operation or the mistaken operation. FIG. 16 illustrates air range FIGS. 5*a*, 5*b* that are displayed when the drag operation with the index finger 6 and the drag operation with the middle finger 7 are both normal operations. Since each of the drag operations is a normal operation, each of the air range FIGS. 5*a*, 5*b* illustrated in FIG. 16 extends from the drag operation starting point to the drag operation end point. The air conditioning setting unit 212 sets an air range corresponding to the air range FIGS. 5*a*, 5*b* illustrated in FIG. 16.

Next, an air range that is set by the air conditioning setting unit 212 when the pressing force to the touch panel 23 is in the second pressing force level or higher will be described. Hereinbelow, an operation to the touch panel 23 in the second pressing force level or higher is referred to as a strong pressing operation. Further, when the pressing force is in the lowest pressing force level and an operation to the touch panel 23 is finished with no drag operation, the operation is determined to be a tap operation. Thus, the strong pressing operation has a larger pressing force than a tap operation and corresponds to the large operation amount operation.

When a strong pressing operation is performed with respect to the touch panel 23 and an operation position of the strong pressing operation is within the air range designation image 4, in addition to a standard range that is determined on the basis of the position of the strong pressing operation, a range extending to one of right and left from the standard range is set as an air range.

The standard range in the present embodiment is the same as the minimum range set in a tap operation. An extending direction, either the right or left direction, of the air range with respect to the standard range differs according to the position where the strong pressing operation is performed.

When the position of the strong pressing operation is a right end part of the air range designation image 4, the air range is extended in the left direction from the standard range. On the other hand, when the position of the strong pressing operation is a left end part of the air range designation image 4, the air range is extended in the right direction from the standard range. The end part in the present embodiment corresponds to one rectangular range 44. However, the end part may be smaller than the rectangular range 44 or larger than the rectangular range 44 differently from the present embodiment.

The length in the right-left direction of the extended part of the air range extended with respect to the standard range is determined according to the level of the pressing force. Specifically, when the pressing force level is the second lowest pressing force level, in other words, the lowest pressing force level as a strong pressing operation, the air range is extended from the standard range by a length corresponding to one rectangular range 44.

When the pressing force level is the third lowest pressing force level, in other words, the second lowest pressing force level as a strong pressing operation, a range extended with respect to the standard range by a length corresponding to two rectangular ranges 44 is defined as an air range. Note that the length in the up-down direction is not changed from the standard range.

When the position of the strong pressing operation is a central part of the air range designation image 4, the air range is extended to both sides in the right-left direction. However, in the present embodiment, the air range is not simultaneously extended to right and left. When the pressing force with respect to the touch panel 23 is in the second pressing force level, the air range is extended to the right side. In the present embodiment, the central part of the air range designation image 4 corresponds to a central one of the three columns of rectangular ranges 44 included in the air range designation image 4. However, the central part may be wider than the rectangular ranges 44 in the central column or, on the other hand, may be narrower than the rectangular ranges in the central column.

When the pressing force with respect to the touch panel 23 becomes stronger and the level thereof becomes the third lowest pressing force level, the air range is extended to the left side in addition to the right side. An extending length of the air range is a length corresponding to one rectangular range 44.

Figure 17:
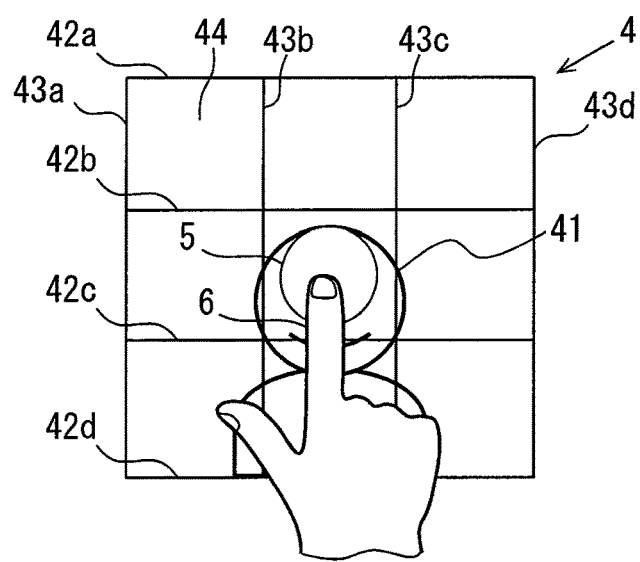
FIG. 17 is a display example of the second embodiment immediately before a strong pressing operation is performed on a central part of an air range designation image.

Also when a strong pressing operation is performed, an air range FIG. 5 corresponding to the air range is displayed in a superimposed manner on the air range designation image 4 during the operation. FIG. 17 illustrates a state in which a part where the face of the occupant image 41 is displayed within the air range designation image 4 is touched with the index finger 6. At the beginning of the operation, the pressing force is in the lowest pressing force level. Thus, the air range FIG. 5 having the same range as that in a tap operation is displayed.

Figure 18:
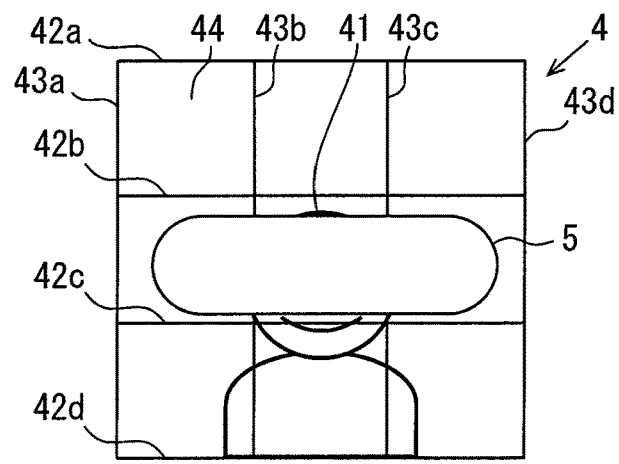
FIG. 18 is a display example after the strong pressing operation is performed at the position of an index finger of FIG. 17.

Then, when it is detected that the pressing force has become the second lowest pressing force level, the air range FIG. 5 extends to the right side from the range of FIG. 17. Further, when it is detected that the pressing force has become the third lowest pressing force level, as illustrated in FIG. 18, the air range FIG. 5 becomes a shape extending to right and left from the air range FIG. 5 illustrated in FIG. 17.

Figure 19:
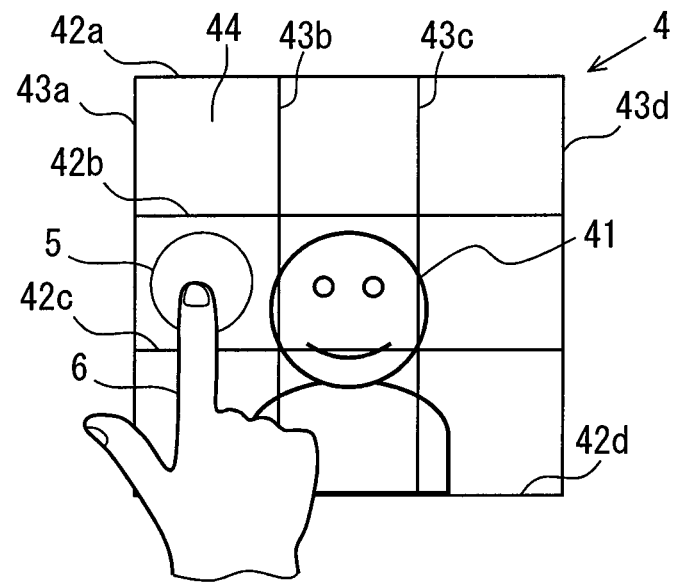
FIG. 19 is a display example of the second embodiment immediately before the strong pressing operation is performed on a left end part of the air range designation image.
Figure 20:
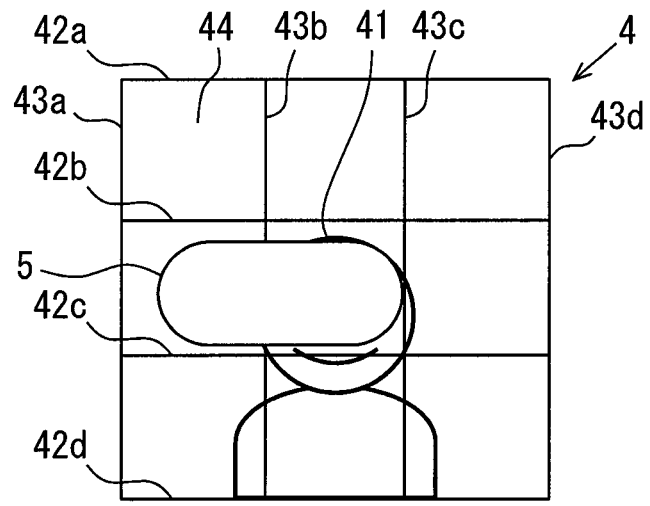
FIG. 20 is a display example after the strong pressing operation is performed at the position of an index finger of FIG. 19.

FIG. 19 illustrates a state in which the central rectangular range 44 on the left end column within the air range designation image 4 is touched with the index finger 6. In this state, the displayed air range FIG. 5 is the same as the air range FIG. 5 that is displayed when the touch position of the index finger 6 is tapped. Then, when it is detected that the pressing force has become the second lowest pressing force level, as illustrated in FIG. 20, the air range FIG. 5 becomes a shape extending to the right side from the air range figure illustrated in FIG. 19 by one rectangular range 44.

In the second embodiment, when drag operations are performed by multi-touch on positions on the air range designation image 4 of the touch panel 23, the air range is set on the basis of each of the drag operations. Thus, it is possible to set an air range that is wider than an air range designated by a drag operation by a single touch by a simple operation.

Further, in the second embodiment, the air range can be set also by a strong pressing operation. Thus, it is possible to easily set the direction of air blown out from the air outlet and the degree of concentration or diffusion of the air by a single strong pressing operation.

The embodiments have been described above as examples. However, the present disclosure is not limited to the above embodiments, and can be changed to various modes including the following modifications.

<Modification 1>

For example, in the above embodiments, the number of grid horizontal lines 42 is four, and the number of grid vertical lines 43 is four. However, the number of grid horizontal lines 42 may be five or more, and the number of grid vertical lines 43 may be five or more. Further, the number of grid horizontal lines 42 may not be equal to the number of grid vertical lines 43.

<Modification 2>

Further, in the above embodiments, the range of air in the right-left direction is set irrespective of the grid vertical lines 43. However, the range of air in the right-left direction may be set in a unit of a range between two grid vertical lines 43.

<Modification 3>

In the above embodiments, the oblique operation is defined as a mistaken operation. However, an air range may be obliquely set without defining the oblique direction as a mistaken operation.

<Modification 4>

In the above embodiments, the air range is adjusted by adjusting the angle of each long plate of the horizontal louver 12 and the angle of each long plate of the vertical louver 14. However, the Coanda effect may be used instead of the louvers or in addition to the louvers to adjust the air range.

<Modification 5>

In the second embodiment, the extending stage of the air range is determined according to the pressing force level, and the pressing force applied to the touch panel 23 can be classified into three levels and detected. However, the detection classification of the pressing force applied to the touch panel 23 may be two stages or four or more stages, and the number of stages of extension of the air range may be set according to these number of stages of the detection classification.

Modification 6>

In the above embodiments, when an operation body is released from the touch panel 23, the air range FIG. 5 and the air range are determined at this point in time. Then, when a touch operation is newly performed on the air range designation image 4 with the air range FIG. 5 displayed, the displayed air range FIG. 5 is deleted, and an air range FIG. 5 that is determined on the basis of the new touch operation is displayed.

However, it may be possible that the air range FIG. 5 can be added within a preset certain time after the release of the operation body from the touch panel 23. Accordingly, it is possible to display the air range FIG. 5a illustrated in FIG. 15 by performing a drag operation with a single finger, then display the air range FIG. 5b by performing a drag operation, and set an air range corresponding to these two air range FIGS. 5a, 5b.

<Modification 7>

In the second embodiment, when a strong pressing operation is performed in the central part of the air range designation image 4, the air range is extended to the right side first and then to the left side. However, the air range may be simultaneously extended to the right side and the left side. In this case, for example, the sum of an extending length of the air range to the right side and an extending length to the left side at the first stage is made equal to the extending length of the air range to the right side in the second embodiment. Further, the sum of the extending length to the right side and the extending length to the left side may be longer than the extending length to the right side in the second embodiment. Further, the air range may be extended to the left side first and then to the right side.

What is claimed is:

1. A vehicle air conditioning setting device mounted on a vehicle and functioning with a vehicle air conditioner for setting a direction of air blown out from an air outlet and a degree of concentration and diffusion of the air, the vehicle air conditioning setting device comprising:
a display that displays an air range designation image including an occupant image representing an occupant seated on a seat of the vehicle;
a touch panel overlapped with the display; and
a processor configured to set an air range representing the direction of the air and the degree of concentration and diffusion of the air based on an operation range of the touch panel on the air range designation image,
wherein:
when a large operation-amount operation, in which an operation amount of one of an operation distance in a direction along a surface of the touch panel and a pressing force to the touch panel is larger than a tap operation, is performed with respect to the touch panel, the processor sets the air range based on the operation amount of the large operation-amount operation;
the large operation-amount operation includes a drag operation having the operation amount in the direction along the surface of the touch panel being larger than the tap operation;
when the drag operation is performed on the touch panel, the processor sets the air range based on a range of the drag operation;
the air range has a rectangular shape with rounded corners;
the air range designation image includes a plurality of horizontal lines that are parallel to each other; and
when the drag operation is performed on the air range designation image on the touch panel, and the drag operation does not cross the plurality of horizontal lines, the processor sets the air range according to the drag operation being performed along with a straight line in a horizontal direction.

2. The vehicle air conditioning setting device according to claim 1, wherein:
when the tap operation is performed on the touch panel, the processor sets a predetermined minimum range determined based on a position of the tap operation as the air range.

3. The vehicle air conditioning setting device according to claim 1, wherein:
when the drag operation is performed on the touch panel according to a multiple touch operation, the air range is set based on the range of the drag operation.

4. The vehicle air conditioning setting device according to claim 1, wherein:
when the drag operation is a mistake operation that designates the air range that cannot be set by the vehicle air conditioner, the processor sets the air range based on a part of the range of the drag operation that is located on the air range designation image and includes one of a start point and an end point of the air range designation image.

5. The vehicle air conditioning setting device according to claim 4, wherein:
when the drag operation is the mistake operation, and the occupant image is not a start point of the drag operation, the processor sets the air range based on the part of the range of the drag operation that is located on the air range designation image and includes the start point of the air range designation image.

6. The vehicle air conditioning setting device according to claim 4, wherein:
when the drag operation is the mistake operation, and the occupant image is a start point of the drag operation, the processor sets the air range based on a right-side part of the range of the drag operation being located on a right side of the air range designation image with respect to the occupant image.

7. A vehicle air conditioning setting device mounted on a vehicle and functioning with a vehicle air conditioner for setting a direction of air blown out from an air outlet and a degree of concentration and diffusion of the air, the vehicle air conditioning setting device comprising:
a display that displays an air range designation image including an occupant image representing an occupant seated on a seat of the vehicle;
a touch panel overlapped with the display; and
a processor configured to set an air range representing the direction of the air and the degree of concentration and diffusion of the air based on an operation range of the touch panel on the air range designation image, wherein:
when a large operation-amount operation, in which an operation amount of one of an operation distance in a direction along a surface of the touch panel and a pressing force to the touch panel is larger than a tap operation, is performed with respect to the touch panel, the processor sets the air range based on the operation amount of the large operation-amount operation;
the large operation-amount operation includes a strong pressing operation having the pressing force to the touch panel larger than the tap operation;
the touch panel is configured to distinguish between the tap operation and the strong pressing operation; and
when the strong pressing operation is performed with respect to the touch panel, and an operation position of the strong pressing operation is within the air range designation image, the processor sets, in addition to a standard range determined based on the position of the strong pressing operation, a range extending to at least one of right and left from the standard range as the air range.

8. The vehicle air conditioning setting device according to claim 7, wherein:
when the strong pressing operation is performed with respect to the touch panel, and an operation position of the strong pressing operation is an end part in a right-left direction within the air range designation image, the processor sets the standard range and the range extending to a center side in the right-left direction of the air range designation image from the standard range as the air range.

9. The vehicle air conditioning setting device according to claim 7, wherein:
when the strong pressing operation is performed with respect to the touch panel, and an operation position of the strong pressing operation is a center part within the air range designation image, the processor is configured to set, in addition to the standard range, the range extending to both sides in the right-left direction of the air range designation image from the standard range as the air range.

10. The vehicle air conditioning setting device according to claim 7, wherein:
the touch panel is configured to detect the pressing force in a plurality of levels as the strong pressing operation; and
the processor determines a length of the air range in the right-left direction according to a magnitude of the pressing force of the strong pressing operation.

11. A vehicle air conditioning setting device mounted on a vehicle and functioning with a vehicle air conditioner for setting a direction of air blown out from an air outlet and a degree of concentration and diffusion of the air, the vehicle air conditioning setting device comprising:
a display that displays an air range designation image including an occupant image representing an occupant seated on a seat of the vehicle;
a touch panel overlapped with the display; and
a processor configured to set an air range representing the direction of the air and the degree of concentration and diffusion of the air based on an operation range of the touch panel on the air range designation image, wherein:
when a large operation-amount operation, in which an operation amount of one of an operation distance in a direction along a surface of the touch panel and a pressing force to the touch panel is larger than a tap operation, is performed with respect to the touch panel, the processor sets the air range based on the operation amount of the large operation-amount operation;
the large operation-amount operation includes a drag operation having the operation amount in the direction along the surface of the touch panel being larger than the tap operation;
when the drag operation is performed on the touch panel, the processor sets the air range based on a range of the drag operation;
the air is blown out from the air outlet toward a whole of the air range;
the air range designation image includes a plurality of horizontal lines that are parallel to each other; and
when the drag operation is performed on the air range designation image on the touch panel, and the drag operation does not cross the plurality of horizontal lines, the processor sets the air range according to the drag operation being performed along with a straight line in a horizontal direction.

12. The vehicle air conditioning setting device according to claim 11, wherein:
the air is blown out from the air outlet toward the whole of the air range so as to maintain the degree of concentration or diffusion of the air.

* * * * *